United States Patent [19]
Wawrzyniak et al.

[11] Patent Number: 5,759,000
[45] Date of Patent: Jun. 2, 1998

[54] GENERATING HEAD ASSEMBLY WITH GENERATING HEAD AND ROTARY POWER ACTUATOR

[75] Inventors: Walter W. Wawrzyniak, 110 Palmanova Plaza, Humacao, Puerto Rico, 00792; Thomas E. Wawrzyniak, Fraser; Richard A. Habarth, Allen Park, both of Mich.

[73] Assignee: Walter W. Wawrzyniak, Humacao, Puerto Rico

[21] Appl. No.: 838,232

[22] Filed: Apr. 16, 1997

Related U.S. Application Data

[62] Division of Ser. No. 323,702, Oct. 12, 1994, Pat. No. 5,651,645.

[51] Int. Cl.$^6$ ................................................. B23B 47/22
[52] U.S. Cl. ........................... 409/231; 82/1.2; 408/13; 408/152
[58] Field of Search ........................... 82/1.2; 408/13, 408/56, 147, 152, 153, 157, 173, 176; 384/313, 315, 316, 905; 409/135, 136, 231, 233

[56] References Cited

U.S. PATENT DOCUMENTS

| Re. 26,623 | 7/1969 | Erikson . |
|---|---|---|
| 2,269,641 | 1/1942 | Woytych . |
| 2,486,977 | 11/1949 | Peters . |
| 3,076,355 | 2/1963 | Heuser . |
| 3,113,475 | 12/1963 | Lombardo . |
| 3,228,265 | 1/1966 | Stoddard et al. . |
| 3,461,752 | 8/1969 | Kielas et al. . |
| 3,487,748 | 1/1970 | Grage . |
| 3,673,743 | 7/1972 | Giardini et al. . |
| 3,717,393 | 2/1973 | Linda et al. . |
| 3,753,624 | 8/1973 | Walker et al. . |
| 3,817,648 | 6/1974 | Miller . |
| 3,822,618 | 7/1974 | Tomenceak . |
| 3,827,821 | 8/1974 | Swenson . |
| 3,884,590 | 5/1975 | Skrentner et al. . |
| 4,509,236 | 4/1985 | Morita et al. . |
| 4,867,619 | 9/1989 | Briggs . |
| 5,150,994 | 9/1992 | Hsu . |
| 5,651,645 | 7/1997 | Wawrzyniak ............... 408/13 |

FOREIGN PATENT DOCUMENTS 2508360  12/1982  France .

*Primary Examiner*—Daniel W. Howell
*Attorney, Agent, or Firm*—Harness, Dickey & Pierce, P.L.C.

[57] ABSTRACT

A generating head assembly for cutting or machining a surface on a workpiece and including a generating head mounted for relative rotation with the workpiece and with cutting or machining members having a radially advanced cutting or machining position for cutting or machining the surface of the workpiece and a radially retracted non-cutting on non-machining position; the generating head assembly includes an actuating structure for providing relative rotation between the generating head and the workpiece and a rotary motor mounted with the generating head; the rotary motor is selectively operable to rotate an actuating shaft relative to the generating head to actuate the cutting or machining members to their radially advanced and retracted positions without axial thrust loads being applied to the generating head.

10 Claims, 5 Drawing Sheets

GENERATING HEAD ASSEMBLY WITH GENERATING HEAD AND ROTARY POWER ACTUATOR

This is a division of United States patent application Ser. No. 08/323,702, filed Oct. 12, 1994, now U.S. Pat. No. 5,651,645.

BACKGROUND AND SUMMARY OF THE INVENTION

The present invention relates to cutting tools or, more generally, to machining tools and more particularly to a generating head assembly with a generating head having a rotary power actuator for moving the cutters and/or cutter holders, which are supported on the generating head, into an advanced, cutting position and to a retracted, non-cutting position.

Generating heads are frequently rotatably mounted and include one or more cutters which can be selectively actuated radially or transversely to the axis of rotation in one direction to a cutting position and in an opposite direction to a non-cutting position. With rotatable generating heads, actuation of the cutters and/or cutter holders occurs while the generating head is rotating. Prior generating head constructions have utilized a linear power actuator in the form of a linearly reciprocating draw bar to actuate the cutters and/or cutter holders. In such constructions, a drive gear in the generating head is rotated by linear, axial reciprocation of the draw bar and acts on one or more cross-slide members or feed bars to cause them to be reciprocated radially or transversely to the axis of rotation to effect movement of associated cutters between an advanced, cutting position and a retracted, non-cutting position. In one form, the draw bar functions to rotate an annular drive gear through linear action with a rack and pinion type construction. In another form, the draw bar actuates an annular drive gear through linear action on a helical spline type connection. With such constructions the draw bar is mounted for linear reciprocation generally along the axis of rotation and is actuated by a hydraulically or pneumatically energized power piston. The linearly reciprocating actuation results in axial thrust and vibrational loads applied by the draw bar to the generating head and associated apparatus such as bearings, support structures and the like. An adequate structure must be provided to react and/or absorb such axial thrust loads while maintaining the desired position and alignment of the generating head and associated cutters. In addition, with this type of construction, the entire assembly, including the generating head, the power piston and draw bar are rotated as a unit generally about the axis of the generating head. The result is a construction of relatively large proportions. Examples of such prior constructions can be seen from the following United States patents issued to Walter W. Wawrzyniak: U.S. Pat. No. 4,004,332 issued Jan. 25, 1977 for "Facing Head", U.S. Pat. No. 4,039,230 issued Aug. 2, 1977 for "Structure For And Method Of Lubricating A Rotating Facing Head", U.S. Pat. No. 4,197,040 issued Apr. 8, 1980 for "Facing And Boring Head" and U.S. Pat. No. 4,476,613 issued Oct. 16, 1984 for "Facing Head".

In the present invention, a unique construction is provided utilizing a hydraulic or pneumatic rotary power actuator. With such a fluid actuated construction the overall size and weight of the generating head and the generating head assembly can be substantially reduced while still providing the desired actuation of the cutters. At the same time generally standard components can be used for the rotary power actuator thereby simplifying the adoption and use of its design for generating heads of different sizes and shapes. In addition undesirable thrust loads of high magnitude can be eliminated.

In one form of the invention the fluid rotary power actuator is in the form of a hydraulic motor provided with a unique porting arrangement facilitating construction of the generating head assembly.

Also in one form of the invention a unique construction for a rotatable fluid manifold is provided permitting water cooling and hence cutting operations at higher speeds.

Thus it is an object of the present invention to provide a unique generating head construction in which the cutters are actuated by a rotary power actuator which is adapted to be additionally rotated with the generating head.

It is an object of the present invention to provide a unique generating head construction in which the cutters are actuated by a rotary power actuator with substantially no axial thrust load applied to the generating head.

It is another general object of the present invention to provide a new and improved generating head construction.

It is still another object to provide a unique combination of generating head and rotary actuator for actuating the cutters to and from selected cutting positions.

Other objects, features and advantages of the present invention will become apparent from the subsequent description and the appended claims taken in conjunction with the accompanying drawings.

DESCRIPTION OF EMBODIMENTS OF THE INVENTION

Figure 1:
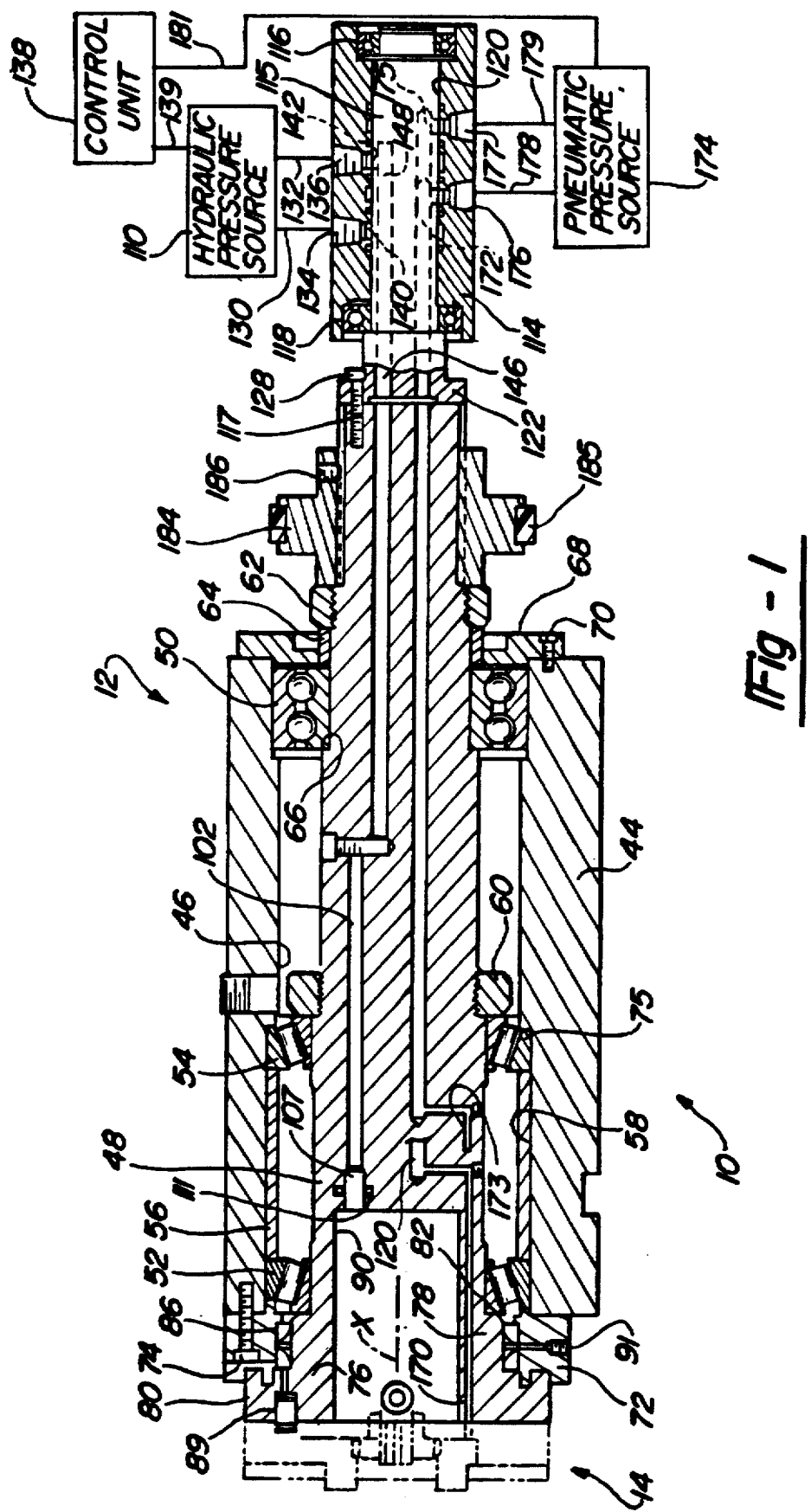
FIG. 1 is a longitudinal sectional view of a drive and actuating assembly for a generating head assembly including a portion of the actuating assembly for the generating head with a portion of the generating head shown in phantom.
Figure 2:
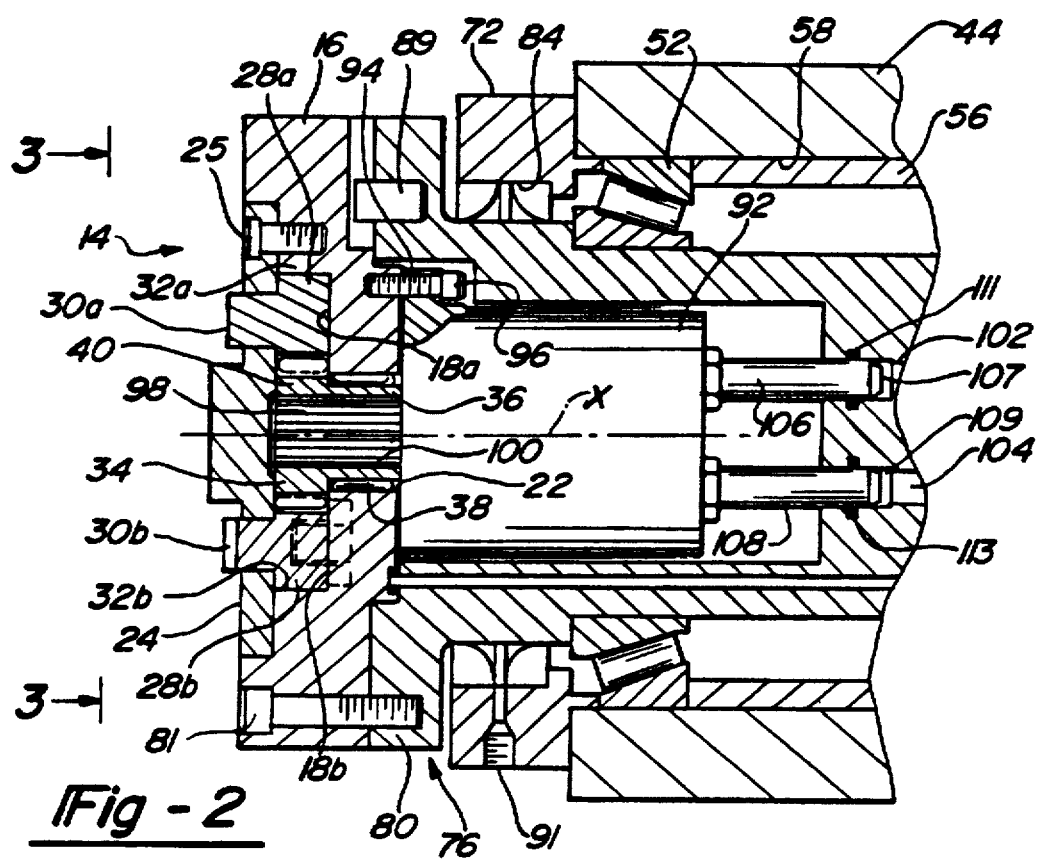
FIG. 2 is a fragmentary view, to increased scale relative to FIG. 1, with some parts shown in section of the forward end of the apparatus of FIG. 1 taken generally along a line in the direction of the Arrows 2—2 in FIG. 3 and including the generating head shown in solid lines.
Figure 3:
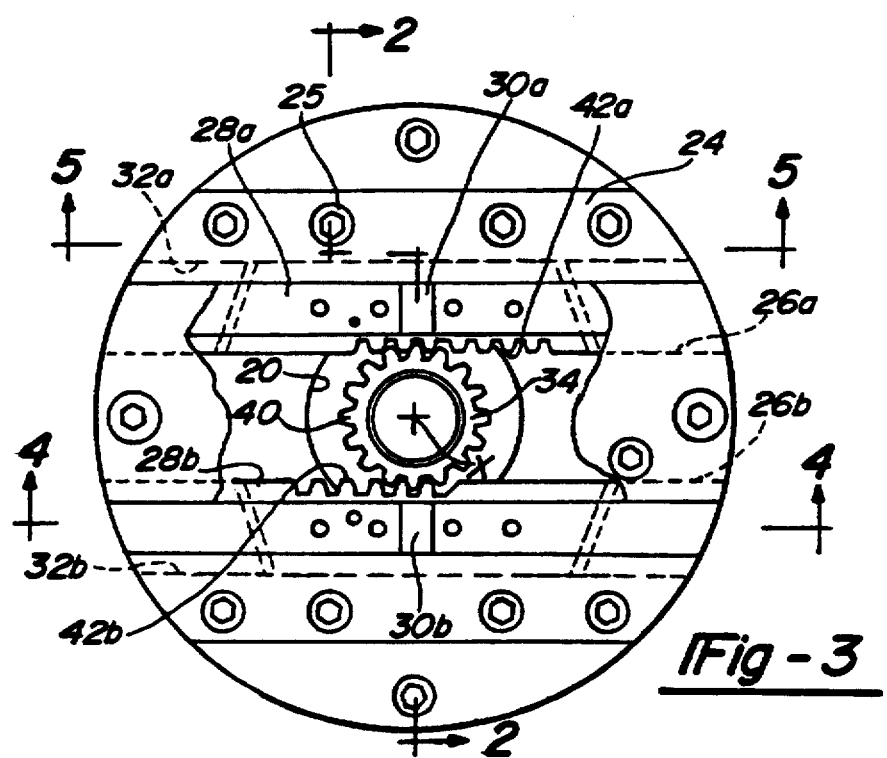
FIG. 3 is a front elevational view, with some parts shown broken away, of the generating head of FIG. 2 taken generally in the direction of the Arrow 3 in FIG. 2.

Looking now to FIGS. 1–3, a generating head assembly 10 is shown and includes a drive and actuating assembly 12 (see FIGS. 1 and 2) and a rotatable generating or cutting head 14 (see FIGS. 2 and 3). Looking now to FIGS. 2 and 3, the generating head 14 includes a generally annular housing 16. A centrally located, through bore 22 extends axially through the housing 16 along an axis X and terminates at its outer end in an enlarged counterbore 20. The axis X defines the axis of rotation of the generating head 14. The front face of the housing 16 is of a stepped construction defined by a pair of spaced, diametrically extending, generally rectangular slots 18a, 18b which partially intersect and are located on opposite radial sides of counterbore 20.

A cover plate 24 is adapted to generally, matingly fit within the projected areas of the slots 18a, 18b and counterbore 20 and is secured therein to housing 16 by fasteners 25. Each of a pair of substantially similar feed bars 28a and 28b are located within one of the slots 18a, 18b and each is slidably supported between a radially inner support surface 26a, 26b and a radially outer support surface 32a, 32b. The generally parallely extending surfaces 26a, 26b and 32a, 32b define the associated one of the slots 18a, 18b. At the same time the feed bars 28a, 28b are axially retained within the respective one of the slots 18a, 18b by the cover plate 24. Each of the feed bars 28a, 28b has an axially outwardly extending portion 30a, 30b located generally centrally along its length with the portions 30a and 30b being located in clearance slots in the cover plate 24.

A pinion drive gear 34 has a reduced diameter portion 36 rotatably supported in through bore 22 via a needle bearing 38 (see FIG. 2). An enlarged diameter portion 40 of drive gear 34 has a toothed outer structure adapted to drivingly engage mating gear rack teeth 42a, 42b which are located on the radially inner ends of the feed bars 28a, 28b, respectively. The enlarged diameter portion 40 of drive gear 34 is located in radial clearance in the enlarged diameter counter bore 20 which intersects slots 18a, 18b. As can be seen in FIG. 3, the gear rack teeth 42a, 42b are located on opposite radial ends of the feed or slide bars 28a, 28b relative to each other. Thus, as the drive gear 34 is rotated in a counter-clockwise direction, as viewed in FIG. 3, both of the feed bars 28a, 28b will be moved radially or transversely outwardly to an advanced, cutting position. Conversely, clockwise rotation of the drive gear 34 will move the feed bars 28a, 28b radially or transversely inwardly to a retracted, non-cutting position as shown in FIG. 3. Suitable cutters or machining members, not shown, can be secured to the feed bars 28a, 28b for performing the desired cutting or machining operations on a workpiece. In this regard, the general overall construction and operation of generating heads, such as generating head 14, are well known in the art and hence additional details such as the cutters, specific attachment of the cutters and related members associated with the feed bars 28a, 28b which do not form a part of the present invention have been omitted for purposes of simplicity.

Looking now to FIGS. 1 and 2, the drive and actuating assembly 12 includes a fixed drive housing member 44 which is of a generally cylindrical construction having a radially stepped through bore 46. An elongated drive spindle 48 extends axially through the bore 46 of housing member 44 and is rotatably supported at its outer end by a dual ball bearing assembly 50 and at its inner end by a tapered roller bearing assembly 52. A second tapered roller bearing assembly 54 is oppositely oriented, thrustwise, relative to the bearing assembly 52 and is located generally midway along the drive spindle 48 at a location spaced from the bearing assembly 52 by a spacer sleeve 56. The spacer sleeve 56 fits snugly within an enlarged diameter portion 58 of through bore 46 and engages the outer races of bearing assemblies 52 and 54. A retaining nut 60 is threadedly secured to the drive spindle 48 to axially retain the inner bearing assembly 54 via engagement with its inner race. In a similar fashion, a retaining nut 62 on a threaded outer end portion of the spindle 48 axially retains the dual ball bearing assembly 50 via engagement with a sleeve 64 operative against the axially outer side of the inner race and a shoulder 66 operative against the inner side of the inner race. An outer retaining plate 68 is connected to the outer end of the housing 44 via fasteners 70 to further axially secure the dual ball bearing assembly 50 and hence the drive spindle 48 at that outer end. In addition the retaining plate 68 generally encloses that end of the bore 46. Similarly, an inner, annular retaining plate 72 is connected to the inner end of the housing 44 via fasteners 74 and operates against the outer race of the inner roller bearing assembly 52 to axially secure the roller bearing assembly 52 and hence the spindle 48 at that inner end. At the same time the outer bearing races of bearing assemblies 52 and 54 are axially clamped by the retaining plate 72, spacer sleeve 56 and shoulder 75 on bore portion 58.

The drive spindle 48 has a head portion 76 at its inner end which includes a base portion 78 of intermediate diameter and an enlarged end flange 80. The base portion 78 defines a retaining shoulder 82 which is engageable with the inner race of the inner roller bearing 52. The base portion 78 is radially spaced from the confronting surface of bore 84 through the inner retaining plate 72. A double annular seal 86 is located in the annular space therebetween while a lubricating fitting 91 is located in a radial lubricating bore whereby a suitable lubricant can be injected via inline passages. The housing 16 of the generating head 14 is secured to the end flange 80 by the fasteners 81. A drive key 89 also drivingly connects the housing 16 to the end flange 80.

The spindle head portion 76 has a large diameter motor cavity 90 at its inner end for receiving a hydraulically actuated drive motor 92 (see FIG. 2). The drive motor 92 has a retention flange 94 whereby the motor 92 can be secured to the housing 16 via fasteners 96. In one form of the invention, the hydraulic drive motor 92 was a ROTAC Model MPJ-22 manufactured and sold by the Cadillac Gage Division of the Ex-Cell-O Corporation and since the specific details of the motor 92 do not constitute a part of the present invention,these details have been omitted for purposes of simplicity. The drive motor 92 has a splined output shaft 98 adapted to matingly engage a similarly splined bore 100 through the pinion drive gear 34 (see FIG. 2). Thus, the drive motor 92 can be actuated to rotate the pinion drive gear 34 both clockwise and counterclockwise to selectively move the feed bars 28a, 28b to an advanced, cutting position or to a retracted, non-cutting position.

The drive spindle 48 has a plurality of axially extending fluid passages with passages 102 and 104 adapted to be in fluid connection to the hydraulic drive motor 92 by fluid conduits or tube members 106 and 108, respectively. (See FIGS. 1 and 2) The fluid conduits 106 and 108 are adapted to be slidingly received with a generally close tolerance fit within counterbores 107 and 109 at the ends of passages 102, 104, respectively, with O-ring seals 111, 113 in slots in counterbores 107, 109 providing sealing engagement for fluid conduits 106, 108. As will be seen the conduits 106 and 108 can be alternately placed in fluid communication between a high pressure fluid output and a low pressure fluid return or tank of a hydraulic pressure source 110 whereby the drive motor 92 can be actuated to selectively rotate its splined output shaft 98 clockwise or counterclockwise.

The fluid passages 102 and 104 of drive spindle 48 are connected to the hydraulic pressure source 110 via a fluid manifold or rotating union 112. The manifold or union 112 has a cylindrical manifold housing 114 which rotatably supports a feeder shaft 115 via ball bearing assemblies 116 and 118 located in counterbores at the opposite ends of through bore 120. The feeder shaft 115 has an enlarged flange 122 which is connected to the outer end 117 of the drive spindle 48 via fasteners 128. The drive housing 44 and the manifold housing 114 are fixed while the drive spindle 48 and feeder shaft 115 are supported therein, respectively, for rotation together.

The rotating union 112 can be a type manufactured and sold by Deublin Company, such as Model 479-400 and since the specific details thereof do not constitute a part of the present invention, these details have been omitted for purposes of simplicity.

The hydraulic pressure source 110 has a pair of outlets 130 and 132 which are connected to ports 134 and 136, respectively, in manifold housing 114. A control unit 138 is connected to the hydraulic pressure source 110 via control line 139 and is operative to alternately connect the outlets 130 and 132 between the high pressure, outlet side and low pressure, return side of the hydraulic pressure source 110. The ports 134 and 136 are in radial alignment with and communicate with annular passages 140 and 142, respectively, in the feeder shaft 115. The annular passage 140 in turn is connected to a bore 146 extending axially through feeder shaft 115 while annular passage 142 is connected to bore 148 extending axially through feeder shaft 115. The passages 102 and 104 through the drive spindle 48 are interconnected with bores 146 and 148, respectively, in feeder shaft 115 via the connection between the flange 122 and engaging outer end 117 of the drive spindle 48 with face seals (not shown) between the passages 102, 104 and bores 146, 148 providing the necessary fluid tight seal at the engaging surfaces. In this regard it should be understood that the various fluid connections between separate components contain appropriate hydraulic seals in a manner well known in the art and hence the description of such seals has been omitted for purposes of simplicity.

Figure 4:
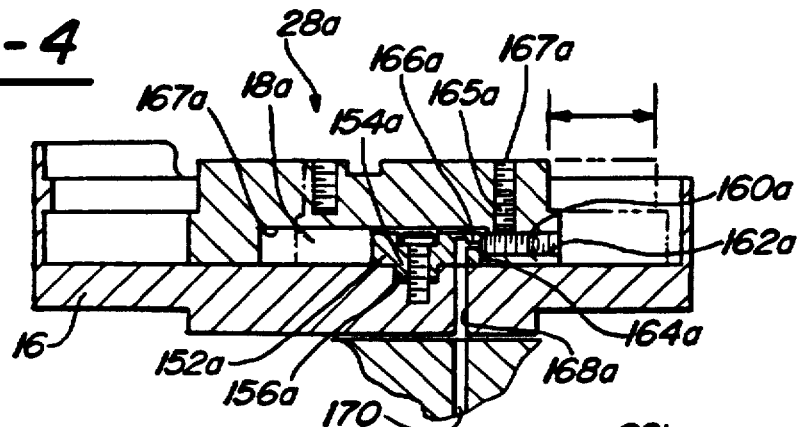
FIG. 4 is a partial fragmentary, sectional view of the generating head of FIGS. 2 and 3 taken generally along a line in the direction of the Arrows 4—4 in FIG. 3.
Figure 5:
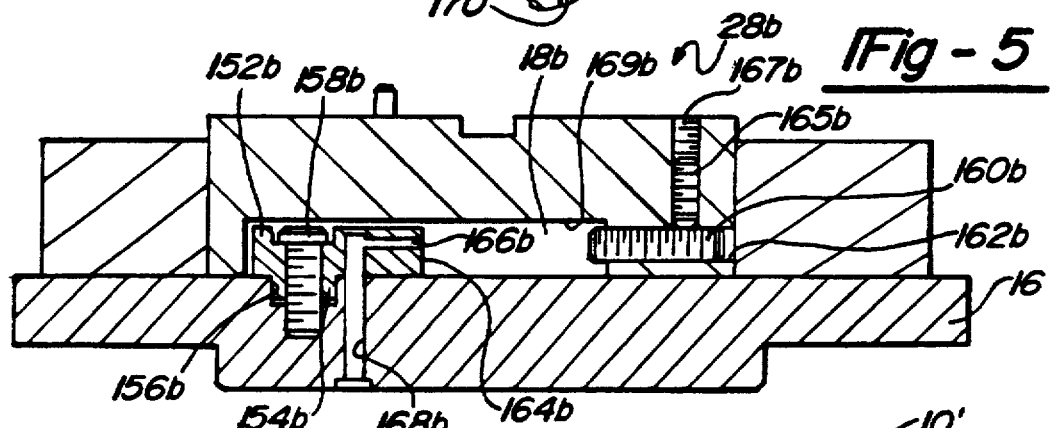
FIG. 5 is a partial fragmentary, sectional view to increased scale relative to FIGS. 2–4 of the generating head of FIGS. 2 and 3 taken generally along a line in the direction of the Arrows 5—5 in FIG. 3.

It is desirable that the advanced and retracted stop positions of the feed or slide bars 28a, 28b be selectively set and that the attainment of these set positions be sensed. In the embodiment of the present invention the sensing function is performed pneumatically. Since both feed bars 28a, 28b are driven by the same pinion gear 34 common stops can be used for setting the desired advanced and retracted stop positions. This can be seen in FIGS. 4 and 5 where the feed bar 28a and associated retract stop plate 152a are shown in FIG. 4 and where the feed bar 28b and associated advance stop plate 152b are shown in FIG. 5. In FIGS. 4 and 5 the feed bars 28a and 2b are shown in their retracted (non-cutting) positions as they are also shown in FIG. 3.

Looking now to FIG. 4, the retract stop plate 152a is of a generally rectangular cross-section and has a rectangular locating boss 154a adapted to be generally matably received within a similarly shaped counterslot 156a in the slot 18a in housing 16. A bolt 158a secures the stop plate 152a in place. The slide bar 28a has an adjustment screw 160a threadably mounted in a bore 162a which is in line with one face 164a of the stop plate 152a which face 164a defines a stop surface. The stop plate 152a is located in a slot 156a in the bottom of the slide bar 28a and which slot 156a extends longitudinally generally in the direction of travel of the slide bar 28a. In FIG. 4 the slide bar 28a is shown in its fully retracted position at which the adjustment screw 160a engages the stop face 164a of the stop plate 152a whereby the slide bar 28a can no longer move in that direction. It can be seen that by threadably advancing or retracting the adjustment screw 160a the stop position for the full retraction of the slide bar 28a can be selectively set. Since, as noted, the slide bar 28a and slide bar 28b are commonly geared through pinion drive gear 34 for simultaneous movement, the interaction of the adjustment screw 160a and stop plate 152a will determine the final fully retracted stop position for both of the slide bars 28a and 28b. The adjustment screw 160a can be fixed in the selected stop position by transverse engagement of a set screw 165a in a cross bore 167a. The attainment of this final retracted position by the slide bar 28a is sensed pneumatically. Thus a sensing port 166a extends inwardly from the stop face 164a and is in communication with a transversely extending bore 168a. The transverse bore 168a in turn is in line with and in communication with pneumatic bore 170 (see FIGS. 1 and 4). The bore 170 is of a stepped construction and extends axially through the drive spindle 48 and communicates with a bore 172 in the feeder shaft 115 of the rotating union 112. The bore 172 is in turn connected to a source of pneumatic pressure 174 via an input port 176 and an air line 178.

The advance stop plate 152b is similar in construction and operation to that of the retract stop plate 152a. Thus, looking now to FIG. 5, the stop plate 152b is located in a clearance slot 169b in the bottom of the slide bar 28b and which slot 169b extends longitudinally generally in the direction of travel of the slide bar 28b. The advance stop plate 152b is of a generally rectangular cross-section and has a rectangular locating boss 154b adapted to be generally matably received within a similarly shaped counterslot 156b in the slot 18b in housing 16. A bolt 158b secures the stop plate 152b in place. The slide bar 28b has an adjustment screw 160b threadably mounted in a bore 162b which is in line with one face 164b of the stop plate 152b which face defines a stop surface. In FIG. 5 the slide bar 28b is shown in its fully retracted position at which the adjustment screw 160b is spaced from the stop face 164b of the stop plate 152b whereby the slide bar 28b can be moved in that direction. It can be seen that by threaded movement of the adjustment screw 160b the stop position for the full advancement of the slide bar 28b can be selectively set. Since, as noted, the slide bars 28a and 28b are geared for simultaneous movement in opposite radial or transverse directions, the interaction of the adjustment screw 160b and stop plate 152b will determine the final fully advanced or cutting position for both of the slide bars 28a and 28b. The adjustment screw 160b can be fixed in the selected stop position by the transverse engagement of a set screw 165b located in a cross bore 167b. The attainment of the final advanced position is sensed pneumatically. Thus a sensing port 166b extends inwardly from the stop face 164b and is in communication with a transversely extending bore 168b. The transverse bore 168b in turn is in line with and in communication with pneumatic bore 173 (see FIG. 1). The bore 173 is of a stepped construction and extends axially through the drive spindle 48 and communicates with a bore 175 in the feeder shaft 115 of the rotating union 112. The bore 175 is in turn connected to the source of pneumatic pressure 174 via an input port 177 and an air line 179.

Pressure sensors (not shown) in the pneumatic pressure source 174 are interconnected with the control unit 138 via a sensor line 181. In the embodiment as shown, the pneumatic pressure source 174 makes available a continuous supply of air under pressure to the sensing ports 166a, 166b via the various communicating bores in the feeder shaft 115, drive spindle 48, housing 16 and stop plates 152a, 152b. When the slide bar 28a is not in the fully retracted position the adjustment screw 160a will be spaced from the sensing port 166a permitting the full flow of air therethrough from the pneumatic pressure source 174. Upon reaching the fully retracted position as shown in FIG. 4, the adjustment screw 160a will be in blocking engagement with the sensing port 166a. This will result in a rise in pressure in air line 178 from the pneumatic pressure source 174 which will be sensed with a signal generated and transmitted to the control unit 138 via sensor line 181. In a similar manner when slide bar 28b reaches the fully advanced position, the adjustment screw 160b will be in blocking engagement with the sensing port 166b. This will also result in a rise in pressure which will now be in air line 179 and which will be sensed and a related signal transmitted to the control unit 138 via sensor line 181. The above sensed information can be selectively utilized to control the operation of the assembly 10. The function and operation of control unit 138 can vary depending upon the specific application for which the generating head 14 is to be employed.

In the operation of the assembly 10 for the generating head 14 to perform a cutting operation, the drive housing 44 and manifold housing 114 are held stationary. The interconnected drive spindle 48 and fluid feeder shaft 115 are secured together as noted whereby rotation of the spindle 48 and shaft 115 will result in rotation of the generating head 14. In this regard, the drive spindle 48 and feeder shaft 115 can be rotated by a pulley 184 which is drivingly fixed to the outer end of the drive spindle 48 and can be driven by a belt 185. In the embodiment of FIG. 1, the pulley 184 is keyed to the drive spindle by a splined connection and is axially secured at one end by engagement with the retaining nut 62 and at the opposite end by a set screw 186.

In performing a cutting operation, the generating head 14 is rotated by the drive spindle 48 via the pulley 184. Next with a workpiece located in a position to be machined by the generating head 14, the control unit 138 is actuated to condition the hydraulic pressure source 110 to provide fluid pressure to the drive motor 92 causing it to rotate the pinion drive gear 34 whereby the feed or slide bars 28a,b are moved radially or transversely outwardly to the preset advanced, cutting position. In this position, the cutters or machining elements (not shown), which are secured to the slide bars 28a,b and are being rotated by the generating head 14, can now engage the surface of the workpiece to perform the desired machining operation. Upon completion of that operation, the control unit 138 will be actuated to condition the hydraulic pressure source 110 to reverse the high pressure or output side and low pressure or return side connections between the outlets 130 and 132 whereby the drive motor 92 will be actuated to rotate in the opposite direction to return the feed or slide bars 28a,b to the fixed, preset retracted position with the associated cutters being moved out of cutting engagement with the workpiece. The attainment of the fully advanced and retracted positions will be pneumatically sensed, as noted, with this information available for use in the control unit 138 for the operation of the assembly 10.

The above construction provides an assembly with a generating head of a relatively reduced size, including reduced axial width, from the conventional structures noted resulting in a structure which is compact and of lighter weight.

It should be noted that the hydraulic pressure source 110, the pneumatic pressure source 174 including the pressure sensors, and the control unit 138 are elements well known in the art and since the specific details thereof do not constitute a part of the present invention these details have been omitted for purposes of simplicity.

In some applications it may be advantageous to locate the hydraulic drive motor at the opposite or outer end of the drive spindle with the drive spindle being of a tubular, hollow construction and having an actuating shaft supported therein for separate rotation by the hydraulic motor for operating the slide bars on the generating head. Such a construction is shown in FIG. 6.

Figure 6:
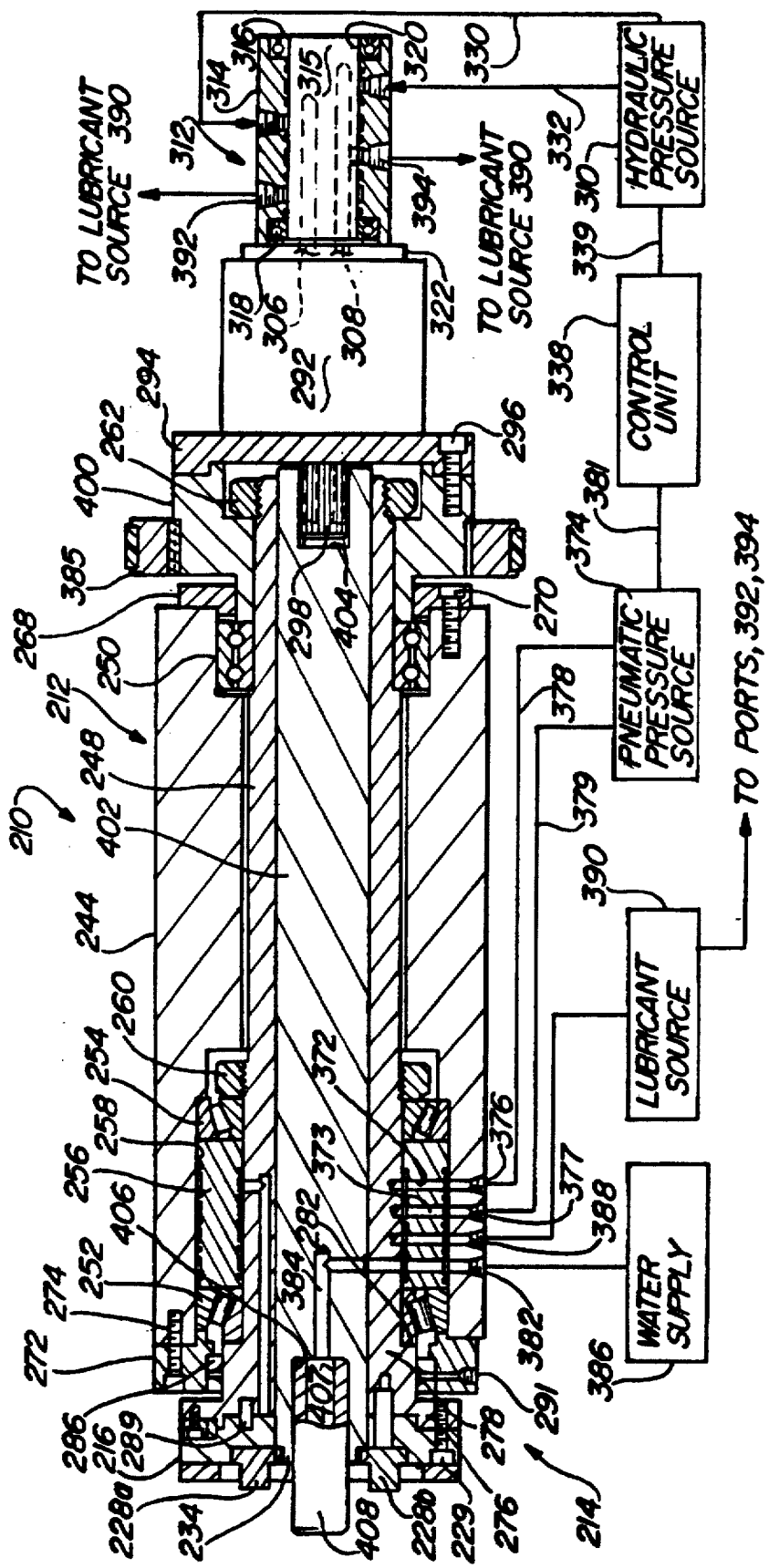
FIG. 6 is a longitudinal sectional view of a modified form of generating head assembly including a modified power actuator for the generating head.

Looking now to FIG. 6, the generating head assembly 210 includes a modified drive and actuating assembly 212. The modified assembly 212 includes a fixed, drive housing member 244 which is of a generally cylindrical construction having a through bore 246 of a radially stepped construction. An elongated drive spindle 248 extends axially through the bore 246 of housing member 244 and is rotatably supported at its outer end by a dual ball bearing assembly 250 and at its inner end by a tapered roller bearing assembly 252. A second tapered roller bearing assembly 254 is oppositely oriented thrustwise relative to the bearing assembly 252 and is located generally midway along the drive spindle 248 at a location spaced from the bearing assembly 252 by an inboard manifold 256. The inboard manifold 256 fits snugly within the bore portion 258 and engages the inner and outer races of bearing assemblies 252 and 254 to locate them in preselected spaced locations. A retaining nut 260 is threadedly secured to the drive spindle 248 to axially retain the inner bearing assembly 254 via engagement with its inner race. An adapter member 400 is secured to the outer end portion of the drive spindle 248 by a retaining nut 262 which is threadably connected to the outer end of the drive spindle 248. In this manner the adapter member 400 axially retains the dual ball bearing assembly 250 via engagement with the axially outer side of the inner race. An outer, annular retaining plate 268 is connected to the outer end of the stationary housing 244 via fasteners 270 to axially secure the dual ball bearing assembly 250 and hence the drive spindle 248 at that outer end. Similarly, an inner, annular retaining plate 272 is connected to the inner end of the housing 244 via fasteners 274 and operates against the inner roller bearing assembly 252 to axially secure the roller bearing assembly 252 and hence the drive spindle 248 at that inner end.

The drive spindle 248 has an enlarged head portion 276 at its inner end which is of a stepped construction and which includes a base portion 278 of intermediate diameter and an enlarged end flange 280. The base portion 278 defines a retaining shoulder 282 which is engageable with the inner race of bearing assembly 252. An annular, double seal 286 is located in a counterbore 284 in the inner retaining plate 272 and is in sealing engagement with the confronting surface of the base portion 278. A lubricating fitting 291 is located in a radial lubricating bore whereby a suitable lubricant can be injected. The housing 216 of the generating head 214 is secured to the end flange 280 by the fasteners 229. A drive key 289 also drivingly connects the housing 216 to the end flange 280. The construction and operation of the generating head 214 is substantially the same as that of the generating head 14 shown and described in connection with the embodiment of FIGS. 1–5 and hence the generating head 214 has only been generally shown and the details thereof have been omitted for purposes of simplicity.

The adaptor 400 is drivingly keyed or connected to the outer end of the drive spindle 248 by splines or other anti-rotation connection and is constructed to be connected to a hydraulically actuated drive motor 292. The drive motor 292 has a retention flange 294 whereby the motor 292 can be secured to the adaptor 400 via fasteners 296. The drive motor 292 has a splined output shaft 298 adapted to matingly engage a similarly splined bore 404 at the outer end of an elongated actuating shaft 402. The inner end of the actuating shaft 402 has a pinion drive gear portion 234 with gear teeth similar to that of the pinion drive gear 34 of FIG. 3. The pinion drive gear portion 234 is in driving engagement with mating gear rack teeth on slide bars 228a,b. By virtue of the splined connection between the motor output shaft 298 and the splined bore 404 of the actuating shaft 402, the hydraulic drive motor 292, when in operation, can rotate the actuating shaft 402 with its pinion drive gear portion 234 either clockwise or counterclockwise to selectively move the feed bars 228a,b to an advanced, cutting position or to a retracted, non-cutting position.

Thus with the construction of FIG. 6, neither the drive spindle 248 nor the actuating shaft 402 are required to have axially extending fluid passages for fluid connection to the hydraulic drive motor 292. In this regard the drive motor 292 has fluid conduits 306 and 308 which are adapted to be connected to a hydraulic pressure source 310 via a direct connection with an outboard fluid manifold or rotating union 312. The outboard manifold 312, which is similar to union 112 of FIGS. 1–5, has a cylindrical manifold housing 314 which supports a feeder shaft 315 for rotation via ball bearing assemblies 316 and 318 located in counterbores at the opposite ends of through bore 320. The feeder shaft 315 has an enlarged flange 322 which is connected to the outer, adjacent end of the housing of hydraulic motor 292 via fasteners (not shown). At the same time the drive housing 244 and the manifold housing 314 are separately fixed from rotation while the drive spindle 248, actuating shaft 402, and feeder shaft 315 are supported therein for rotation together.

Rotation is provided by a pulley 385 which is keyed to the adapter member 400 which in turn is rotatably fixed to the drive spindle 248. As with the embodiment of FIGS. 1–5, a hydraulic high pressure outlet and a low pressure return are connected from the pressure source 310 to the manifold housing 314 via fluid lines 330 and 332. Similarly the hydraulic pressure source 310 is connected to a control unit 338 via a control line 339 whereby selective actuation of the hydraulic pressure source 310 can be made to provide the desired high pressure output and low pressure return between fluid lines 330 and 332.

Also, similarly to the embodiment of FIGS. 1–5, it is desirable that the advanced and retracted stop positions of the feed or slide bars 228a,b be selectively set and that the attainment of these set positions be sensed pneumatically. Thus a pneumatic pressure source 374 has lines 378 and 379 which are connected to ports 376 and 377, respectively, in the stationary housing 244. These ports 376, 377 are in turn connected to bores 372 and 373, respectively, which extend radially through the inboard manifold 256 into associated annular passages and communicate with fluid passages through the drive spindle 248.

The output from pressure sensors (not shown) in the pneumatic pressure source 374 are connected to the control unit 338 via sensor line 381. In the embodiment as shown, the pneumatic pressure source 374 makes available a continuous supply of air under pressure to the sensing ports (such as sensing ports 166a,b) on the generating head 214 via the various communicating bores in the drive spindle 248, generating head housing 216 and stop plates (such as stop plates 152a,b). In this way the position of the slide bars 228a,b can be detected, i.e. fully advanced or retracted, and the sensed information can be selectively utilized to control the further operation of the assembly 210.

In order to provide liquid cooling to the cutting tools operatively connected to the slide bars 228a,b a tube 408 is secured in sealing relationship in a bore 406 in the inner end of the actuating shaft. A cooling liquid in the form of water can be transmitted from a water supply 386 to a port 382 in drive housing 244 and a series of connected passageways through the manifold 256 and the drive spindle 248 which communicate with a series of passageways 384 in the actuating shaft 402 and can then be transmitted to the cutting tools on generating head 214 via the axial bore 407 through the tube 408.

In addition another port 388 in drive housing 244 and a series of connected passageways through inboard manifold 256 can provide lubricant from a lubricant source 390 to the generating head 214, the associated cutters and/or to the surface of the workpiece being cut. At the same time the outboard manifold 312 can provide lubricant to the actuating assembly 212 via ports 392 and 394 and lubricant source 390.

Figure 7:
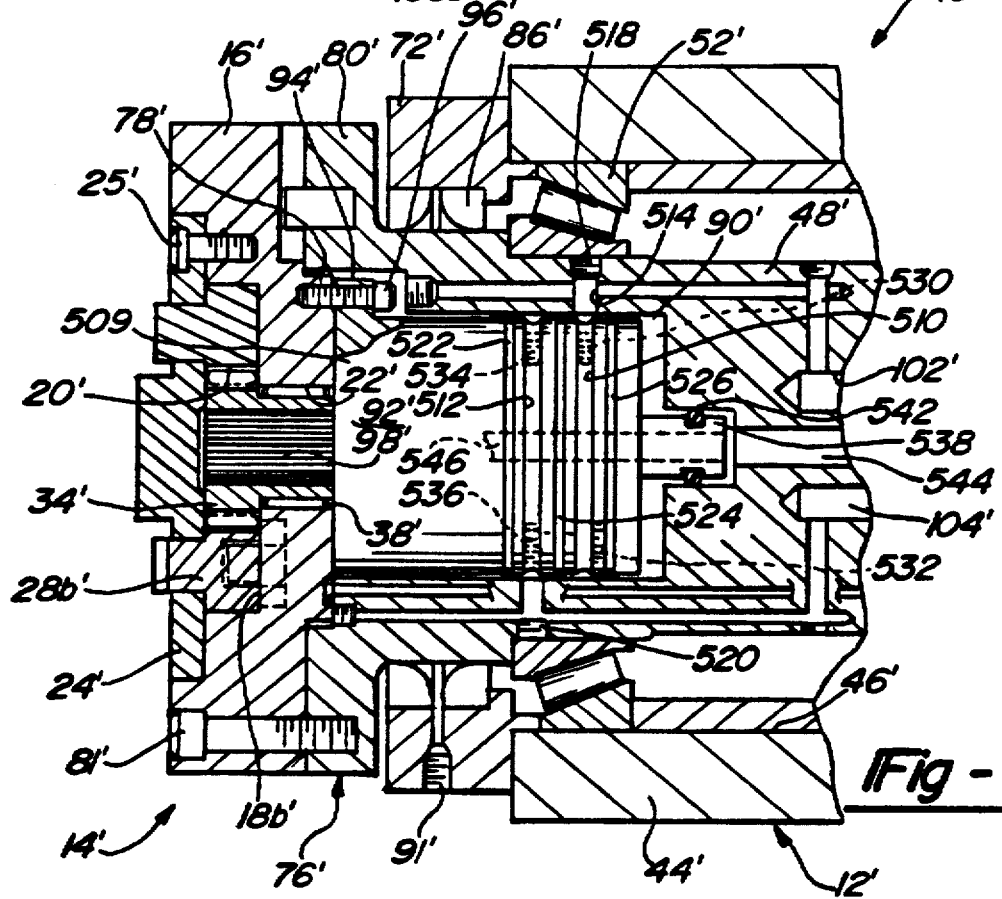
FIG. 7 is a sectional view similar to FIG. 2 but depicting a generating head and associated apparatus including a hydraulic drive motor having a modified hydraulic porting arrangement and including means for providing water cooling.

Another form of the invention is shown in FIG. 7 in which a hydraulic drive motor of unique construction is shown for use in a generating head assembly. The embodiment of FIG. 7 is generally a variation of the form shown in FIGS. 1–5 and specifically as shown in FIG. 2 and thus in the description of the embodiment of FIG. 7 components in the embodiment of FIG. 7 will be given the same numeral designation as like components in the embodiment of FIGS. 1–5 with the addition of a prime.

Looking now to FIG. 7, the generating head assembly 10' is partially shown and includes a drive and actuating assembly 12' (partially shown) and a rotatable generating head 14'. The generating head 14' includes a generally annular housing 16' with a centrally located, through bore 22' which terminates at its outer end in an enlarged counterbore 20'. The front face of the housing 16' has a pair of spaced, diametrically extending, generally rectangular slots 18a', 18b' which partially intersect and are located on opposite radial sides of counterbore 20'.

A cover plate 24' matingly fits within the areas of the slots 18a', 18b' and counterbore 20' and is secured therein by fasteners 25'. A pair of feed bars 28a' and 28b' are separately slidably located within one of the slots 18a', 18b'. The feed bars 28a', 28b' are axially retained within the slots 18a', 18b' by the cover plate 24'.

A pinion drive gear 34' is rotatably supported in through bore 22' via a needle bearing 38'. The drive gear 34' has a toothed outer structure adapted to drivingly engage mating gear rack teeth located on the radially inner ends of the feed bars 28a', 28b'. As noted in the description of the embodiment of FIGS. 1–5, as the drive gear 34' is rotated both of the feed bars 28a', 28b' can be moved to an advanced, cutting position or to a retracted non-cutting position. The drive actuating assembly 12' includes a fixed drive housing member 44' which is of a generally cylindrical construction having a through bore 46'. An elongated drive spindle 48' extends axially through the bore 46' of housing member 44' and is rotatably supported by suitable bearing assemblies such as tapered roller bearing assembly 52'. An inner, annular retaining plate 72' is connected to the inner end of the housing 44' and operates to axially secure the roller bearing assembly 52' and hence the drive spindle 48' at that inner end.

The drive spindle 48' has a head portion 76' at its inner end which includes a base portion 78' and an enlarged end flange 80'. A double annular seal 86' is located in an annular space between the drive spindle 48' and the retaining plate 72'. The housing 16' of the generating head 14' is secured to the end flange 80' by fasteners 81'.

The spindle head portion 76' has a large diameter motor cavity 90' at its inner end for receiving a hydraulically actuated drive motor 92'. The drive motor 92' has a retention flange 94' whereby the motor 92' can be secured to the housing 16' via fasteners 96'. The drive motor 92' has a splined output shaft 98' adapted to matingly engage a similarly splined bore through the pinion drive gear 34'. The drive motor 92' can be actuated to rotate the pinion drive gear 34' both clockwise and counterclockwise to selectively move the feed bars 28a', 28b' to an advanced, cutting position or to a retracted, non-cutting position.

The drive spindle 48' has fluid passages 102' and 104' adapted to be in fluid communication with the hydraulic drive motor 92'. In the embodiment of FIG. 7, however, the drive motor 92' has a unique porting structure. Here the housing 509 of the hydraulic drive motor 92' is provided with a pair of spaced, annular fluid channels or grooves 510 and 512 which are adapted to be in line with radial bores 514 and 516, respectively, in the drive spindle 48'. The radial bores 514 and 516 in turn are in fluid communication with fluid passages 102', 104', respectively, via axial and radial crossports which are provided as a manufacturing convenience. Sealing plugs, such as plugs 518, 520 for bores 514, 516, respectively, are located where necessary to provide flow only to and from the radial bores 514, 516. Pairs of annular sealing grooves 522, 524 and, 526 are located to separate opposite axial sides of porting channels or grooves 510, 512, respectively. Each of the sealing grooves 522–526 contains a suitable O-ring seal for providing fluid sealing on both axial sides of the porting channels or grooves 510, 512. In this regard, the motor cavity 90' and the motor housing 509 are circular in contour with the cavity 90' receiving the confronting portion of the housing 509 with a relatively close tolerance fit to facilitate sealing by the O-rings in sealing grooves 522–526.

In the construction of the drive motor 92', the internal fluid drive mechanism of the driver motor 92' is placed in fluid communication with the porting channels or grooves 510, 512 via diametrically spaced, pairs of radial porting bores. Thus radial porting bores 530, 532 communicate one side of the fluid drive mechanism of motor 92' with porting channel or groove 510 while radial porting bores 534, 536 communicate the other side of the fluid drive mechanism of motor 92' with porting channel or groove 512.

Water cooling can also be provided to the cutting tools of the generating head 14'. Thus a reduced diameter boss 538 extends axially rearwardly from the housing 509 of drive motor 92' and is received with a generally close tolerance fit in counterbore 540 at the end of motor cavity 90'; an annular groove and O-ring 542 in the boss 538 provides sealing engagement with the cavity 90'. An axial through bore 544 communicates with the counterbore 540 and extends through the full length of the drive spindle 48'. An axial bore 546, extends from the boss 538 through the drive motor 92' and through the splined output shaft 98 and is in fluid communication with the counterbore 540 and through bore 544. Cooling water can then be supplied to the through bore 544 to the counterbore 540 and through the drive motor 92' via axial bore 546 from a manifold, such as outboard manifold 312 of FIG. 6 to provide cooling water to the drive motor 92' and the generating head 14'.

The hydraulic drive motor 92' can be generally of a structure of the type of ROTAC Model SS-1A manufactured and sold by Cadillac Gage Division of the Ex-Cell-O Corporation but modified by provision of the unique porting via the annular porting grooves or channels 510, 512 and sealing grooves 522–526 in the housing 509. In other respects the construction of the drive motor 92' is substantially the same as the noted Model SS-1A including the radial porting bores 530–536 and hence the details thereof have been omitted for purposes of simplicity.

Figure 8:
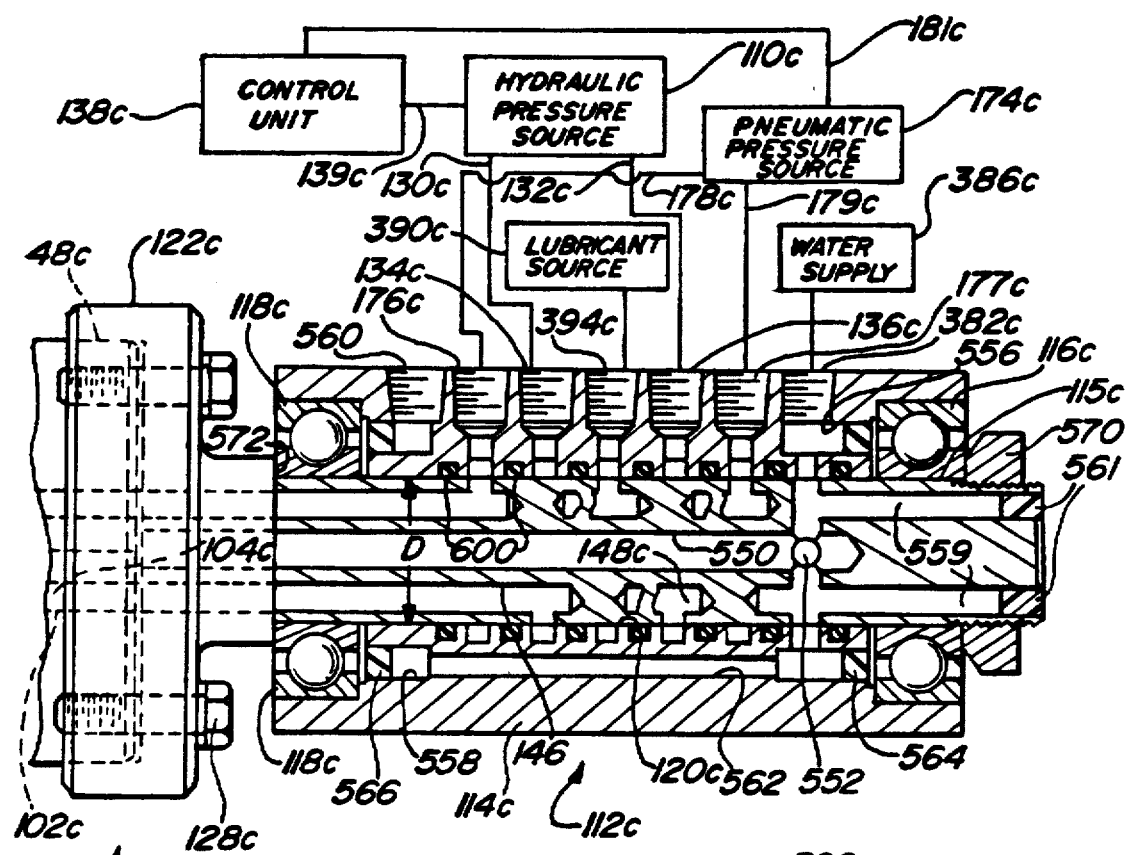
FIG. 8 is a sectional view of a modified union or manifold for use with generating heads and associated apparatus such as shown in FIGS. 1 and 7.
Figure 9:
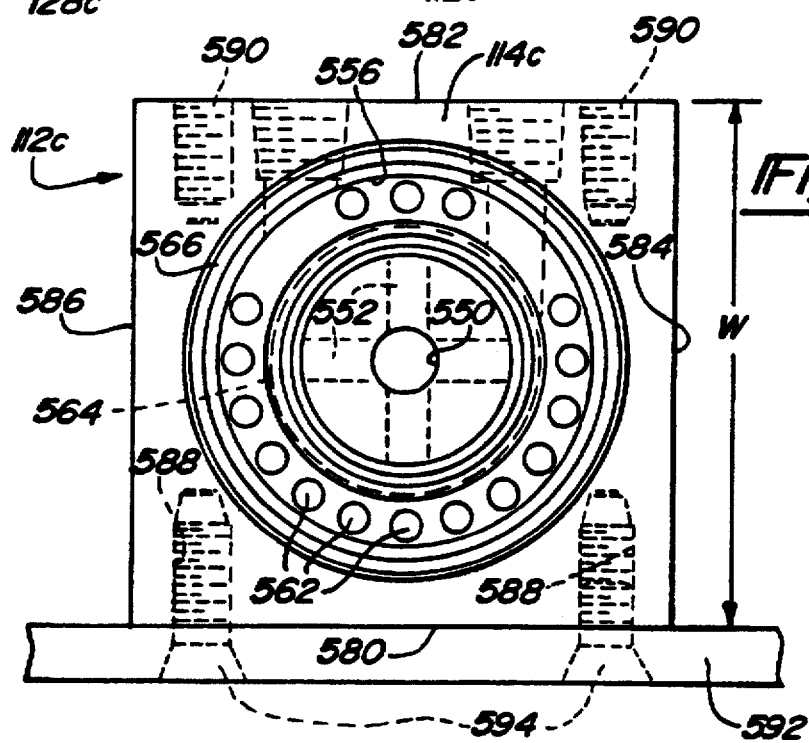
FIG. 9 is a partial sectional view of the modified union or manifold of FIG. 8 taken generally in the direction of the Arrows 9—9 in FIG. 8.

In many cutting or machining operations utilizing generating heads of the type shown and described herein it is desirable to maximize the speed of rotation, and hence cutting speed, of the generating head. One limitation on the maximum cutting speed attainable, however, has been with rotating unions or manifolds of a construction generally as exemplified by the union or manifold 112 in the embodiment of FIGS. 1–5. It has been found that the maximum rotational speed of the associated generating head, and hence cutting speed, can be increased substantially by providing separate water cooling for the housing of the manifold or union. Such a structure is shown in FIGS. 8 and 9 which in the form shown is generally configured for use with the generating head assembly 10 of FIGS. 1–5. Thus in the description of the embodiment of FIGS. 8 and 9 components similar to like components in the embodiment of FIGS. 1–5 have been given the same numeral designation with the addition of the letter postscript "c". Likewise reference to components similar to those in the embodiment of FIG. 6 have been given the same numeral designation with the addition of the letter postscript "c".

Looking now to FIGS. 8 and 9, the fluid passages 102c and 104c of drive spindle 48c are connected to the hydraulic pressure source 110c via a fluid manifold or rotating union 112c. The manifold or union 112c has a cylindrical manifold housing 114c which rotatably supports a feeder shaft 115c via ball bearing assemblies 116c and 118c located in counterbores at the opposite ends of through bore 120c in housing 114c. The feeder shaft 115c has an enlarged flange 122c with a counterbore which receives the outer end 117c of drive spindle 48c. The outer end 117c of the drive spindle 48c is connected to the flange 122c via fasteners 128c. As with the embodiment of FIGS. 1–5, the manifold housing 114c is fixed from rotation while the drive spindle 48c and feeder shaft 115c are supported for rotation together.

The hydraulic pressure source 110c has a pair of outlets 130c and 132c which are connected to ports 134c and 136c, respectively, in manifold housing 114c. The ports 134c and 136c are in radial alignment with and communicate with annular passages in the feeder shaft 115c which in turn are connected to bores 146c and 148c, respectively, which extend axially through feeder shaft 115c. The passages 102c and 104c through the drive spindle 48c are connected to bores 146c and 148c, respectively, in feeder shaft 115c via the connection between the flange 122c and engaging outer end 117c of the drive spindle 48c with face seals (not shown) providing the necessary fluid tight seals at the engaging surfaces.

As with the embodiment of FIGS. 1–5, the advanced and retracted positions of the slide bars (such as bars 28a,b) and associated cutters are pneumatically sensed. Thus pressure sensors (not shown) in a pneumatic pressure source 174c are connected to a control unit 138c via a sensor line 181c. At the same time, the hydraulic pressure source 110c is controlled by the control unit 138c via control line 139c. In the embodiment as shown, the pneumatic pressure source 174c makes available a continuous supply of air under pressure to sensing ports (such as 166a, 166b in FIGS. 1–5) via output lines 178c, 17c, input ports 176c, 177c and the various communicating bores in the feeder shaft 115c, drive spindle 48c, and the like. In addition to the above, the manifold 112c has an input port 394c and related connecting passageways through feeder shaft 115c for providing lubricant from a lubricant source 390c to the related generating head and/or other components. Water cooling from water supply 386c is provided for the associated apparatus of drive and actuating assembly 12c including the associated generating head and cutting tools (such as generating head 14 of FIGS. 1–5), via an input port 382c, an enlarged counterbore 556, four radial bores 552 in quadrature with each other (see FIG. 9) and the axial through bore 550 through feeder shaft 115c.

In order to provide water cooling directly to the manifold 112c a separate series of cooling passages are provided in the manifold housing 114c. Thus a plurality of circumferentially spaced cooling bores 562 extend axially from annular inlet counterbore 556 through the wall of the housing 114c and into fluid communication with an annular outlet counterbore 558 and radial outlet port 560 at the opposite end of the housing 114c. This can best be seen from FIG. 9 which shows the use of some sixteen axially extending, circumferentially spaced cooling bores 562. In this regard it should be noted that the cooling bores 562 are circumferentially oriented about the axis of the feeder shaft 115c with some of the cooling bores 562 located in each 90° quadrant about the axis to provide generally uniform cooling about the feeder shaft 115c. The cooling water from the water supply 386c flows into the manifold housing 114c from inlet port 382c, into inlet counterbore 556 and radial bores 552 and through the cooling bores 562 and is expelled at the opposite or inner end of the manifold housing 114 via outlet counterbore 558 and port 560. In order to further improve the cooling efficiency of the apparatus of FIG. 8, the housing 114c is constructed of a material having good thermal conductivity such as bronze. At the same time water cooling is provided to the outer end of the feeder shaft 115c in the vicinity of the outer bearing assembly 116c by a plurality of axial bores 559 which communicate with radial bores radial bores 552. Bores 559 are sealed by sealing plugs 561.

Annular sealing rings 564 and 566 provide watertight seals for the annular inlet counterbore 556 and the annular outlet counterbore 558, respectively. A retaining nut 570 is located on the threaded outer end of feeder shaft 115c is in engagement with the inner race of bearing 116c at the outer end of the housing 114c. A shoulder 572 on the opposite end of feeder shaft 115c similarly engages the inner race of the bearing assembly 118c at the inner end of the housing 114c.

Frequently the housings of rotatable fluid unions or manifolds such as housings 114, 114c and 314 for manifolds 112, 112c and 312 have outer surfaces which define generally circular cylinders or right circular cylinders. Such housings are routinely prevented from rotation by the numerous fluid coupling connections made through the housing. The result can be vibrational movement of the manifold in response to rotation of the associated feeder shaft (such as feeder shaft 115, 115c and 315). This can result in undesirable wear of bearings, seals, fittings and other components which can be especially aggravated in applications where generating heads are operated at high rotational cutting speeds. The manifold 112c of the present invention is especially adapted for use in such high speed applications. In this regard, high speed applications can be considered generally to be substantially greater than 250 revolutions per minute (rpm) and at least as high as around 3,000 rpm. Thus the housing 114c of the embodiment of FIGS. 8 and 9 while being cylindrical is provided with at least one planar surface. As can be seen in FIG. 9 the housing 114c is generally square shaped having four generally planar surfaces 580, 582, 584, and 586 of generally equal width. Opposite surfaces 580 and 582 are each provided with a plurality of threaded blind holes 588 and 590, respectively. The threaded holes 588, 590 facilitate securing the housing 114c to a stationary, fixed support, such as support table 592, via fasteners 594 whereby the manifold 112a will be fixedly held from vibrational movement. While threaded mounting bores are shown in opposite housing surfaces 580, 582 it should be noted that similar threaded bores could be provided in one or more of the adjacent surfaces 584, 586 to provide greater versatility in mounting. Also a somewhat resilient connection could be provided between the engaged surface 580 and support table 592 to permit controlled movement to accommodate minor misalignment and stack up of dimensional tolerances without excessive stress being applied to the working components.

It is common with rotatable unions or manifolds to provide the feeder shaft to be of a relatively large diameter. In addition, for applications where higher rotational speeds are to be applied, complex and relatively expensive sealing mechanisms such as face seals are employed. It is believed that this is necessitated in part by the high surface speeds at the outer surface of the feeder shaft which can generate undesirable high temperatures from friction. Therefore, at the same time, care must be taken in using the manifold to convey more than one kind of fluid as a result of leakage from possible thermal expansion, friction, seal wear and the like whereby different fluids could be intermixed. In the structure of FIGS. 8 and 9 the feeder shaft 115c is of a relatively small diameter. This factor, in addition to the water cooling provided to the housing 114c permits the use of a relatively simple sealing construction utilizing O-ring seals. Thus as can be seen in FIG. 8, the numerous ports and annular passages are sealed from each other by O-ring seals 600. In addition a large number of axial passages are provided through the feeder shaft 115c for the transmission of fluids from the hydraulic pressure source 110c and the water supply 386c, air from the pneumatic pressure source 174c, and lubricant from the lubricating source 390c to other components of the generating head assembly 10c.

In one embodiment of the manifold 112c of FIGS. 8 and 9 the diameter D of the feeder shaft 115c was approximately one inch (1") while the width W of the sides 580, 582, 584 and 586 of the housing 114c was approximately two and one half inches (2.5"). The feeder shaft 115c had five axial passages of approximately 0.25 inches (¼") in diameter for transmitting the fluids from hydraulic pressure source 110c, pneumatic pressure source 174c and lubricating source 390c. In addition a central fluid passage of approximately 0.375 (⅜) inches was utilized to communicate the cooling water from the water supply 386c to the associated components of the generating head assembly 10c which are external to the manifold 112c. In this regard it is believed advantageous to maintain the diameter D of the feeder shaft 115c generally between around 0.75 (¾) inches to around 1.25 (1¼) inches. With the structure as noted above the manifold 112c can be operated at a rotational speed of around 3,000 rpm. (revolutions per minute) i.e. feeder shaft 115c rotated at that speed with the associated generating head being operated at that same high speed. Thus the unique manifold 112c can be operated at speeds substantially above the conventional speed of 250 rpm and at least as high as around 3,000 rpm.

In the above construction of the manifold 112c, while, as noted, the housing 114c can be constructed of bronze, the feeder shaft 115c can be constructed of a generally high strength, corrosion resistant ferrous material in the form of chrome plated stainless steel. Such materials are commonly used for feeder shafts.

Thus it can be seen that a generating head assembly can be provided including unique features as shown and described. It should be noted that while reference has been made to operations for cutting or machining a workpiece surface these terms should be considered in their broader terms to generally include removal of metal or surface material, polishing and the like.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. A generating head assembly for performing a machining operation on a surface of a workpiece and including:

a generating head for machining the surface of the workpiece through rotation relative to the workpiece surface, said generating head including machining means including at least one machining member actuable to provide a desired machining operation on the workpiece surface and positioning means operatively connected with said machining means to radially position said machining means between a radially advanced machining position and a radially retracted non-machining position relative to the workpiece surface, actuating means comprising a rotary motor being connected with said generating head and actuable to actuate said positioning means to radially position said machining means to said radially advanced machining position in response to rotation of said rotary motor in one direction and to radially position said machining means to said radially retracted non-machining position in response to rotation of said rotary motor in an opposite direction, drive means for rotatably driving said generating head for rotation relative to the workpiece surface and including a drive spindle connected with said generating head and with said actuating means for rotation together about a preselected axis, said drive means including support means for supporting said drive spindle for rotation about said preselected axis together with said generating head and said actuating means, said drive spindle being a generally elongated structure having a forward end adapted to be connected to said generating head, said support means comprising a fixed drive housing and bearing means for providing rotatable support to said drive spindle and said generating head at a location proximate to said forward end of said drive spindle, said rotary motor having a drive shaft adapted to be operatively connected to said positioning means of said generating head for actuating said positioning means, said rotary motor being connected to said drive spindle at the end opposite said forward end and located remotely from said generating head, said drive spindle being of a generally cylindrical shape having a through bore extending from said forward end to said opposite end, a connecting drive shaft extending through said through bore and connecting said drive shaft to said positioning means for actuating said positioning means.

2. The generating head assembly of claim 1 with said generating head including position detecting means operative for detecting when said machining means is in said radially advanced machining position and said radially retracted non-machining position, said position detecting means being responsive to changes in magnitude of air pressure to provide said control signals to said control means by way of such changes in magnitude of air pressure, said position detecting means further comprising position setting means selectively adjustable for selectively setting said radially advanced machining and non-machining positions with said position setting means providing restricted and un-restricted flow for air pressure at each of said radially advanced machining position and said radially retracted non-machining position, said control signals being determined by the difference in magnitude of air pressure between said restricted and un-restricted flow conditions.

3. The generating head assembly of claim 1 including a manifold having a housing and a feeder shaft rotatably supported thereon, means connecting said feeder shaft to said drive spindle for rotation therewith, said manifold being connected to a source of hydraulic pressure and including passage means extending through said feeder shaft in substantially direct fluid communication with said rotary motor whereby hydraulic fluid under pressure can be transmitted to said rotary motor through said feeder shaft.

4. The generating head assembly of claim 3 with said source of hydraulic pressure having a pair of ports each adapted to be switched for alternately providing a high pressure outlet and a low pressure return, said passage means of said manifold and said feeder shaft adapted to communicate said rotary motor to said pair of ports for selective rotation of said rotary motor in opposite directions and including control means operative in response to control signals for controlling said source of hydraulic pressure to selectively switch said pair of ports between operating as said high pressure outlet and said low pressure return.

5. The generating head assembly of claim 4 with said generating head including position detecting means operative for detecting when said machining means is in said radially advanced machining position and said radially retracted non-machining position, said position detecting means being responsive to changes in magnitude of air pressure to provide said control signals to said control means by way of such changes in magnitude of air pressure, said position detecting means further comprising position setting means selectively adjustable for selectively setting said radially advanced machining and non-machining positions with said position setting means providing restricted and un-restricted flow for air pressure at each of said radially advanced machining position and said radially retracted non-machining position, said control signals being determined by the difference in magnitude of air pressure between said restricted and un-restricted flow conditions.

6. A generating head assembly for performing a machining operation on a surface of a workpiece and including:

a generating head for machining the surface of the workpiece through rotation relative to the workpiece surface, said generating head including machining means including at least one machining member actuable to provide a desired machining operation on the workpiece surface and positioning means operatively connected with said machining means to radially position said machining means between a radially advanced machining position and a radially retracted non-machining position relative to the workpiece surface, actuating means comprising a rotary motor being connected with said generating head and actuable to actuate said positioning means to radially position said machining means to said radially advanced machining position in response to rotation of said rotary motor in one direction and to radially position said machining means to said radially retracted non-machining position in response to rotation of said rotary motor in an opposite direction, drive means for rotatably driving said generating head for rotation relative to the workpiece surface and including a drive spindle connected with said generating head and with said actuating means for rotation together about a preselected axis, said drive means including support means for supporting said drive spindle for rotation about said preselected axis together with said generating head and said actuating means, said drive spindle being a generally elongated structure adapted to be connected to said actuating means, said rotary motor having a drive shaft adapted to be operatively connected to said positioning means for actuating said positioning means, said rotary motor being supported on said drive spindle at a location axially spaced from said positioning means, connecting means for connecting said drive shaft from said rotary motor to said positioning means for substantially direct operative engagement with said positioning means, said rotary motor being hydraulically actuated from a source of hydraulic pressure.

7. In a machine assembly for providing controlled actuation of associated apparatus, the combination comprising:

a rotatable machining structure including an elongated drive spindle, said machining structure including at least one machining member actuable to provide a desired machining operation on a workpiece, a fixed housing for rotatably supporting said machining structure, said housing having a generally open forward end, mounting means for supporting said machining member on said drive spindle generally at said front end of said housing for radial, reciprocal linear motion, positioning means operatively connected with said drive spindle of said machining structure to radially position said machining member substantially solely by linear reciprocal motion between a radially advanced position and a radially retracted position relative to the workpiece, actuating means comprising a rotary motor having a rotary drive member connected with said machining structure and actuable to actuate said positioning means to radially position said machining member substantially solely by such linear motion to said radially advanced position in response to rotation of said rotary motor in one direction and to radially position said machining member to said radially retracted position in response to rotation of said rotary motor in an opposite direction, connecting means for connecting said rotary drive member with said drive spindle of said machining structure at a location axially spaced from said forward end of said housing, drive means including support means for supporting said drive spindle with said fixed housing for rotation about a preselected axis together with said actuating means, said drive means rotatably driving said drive spindle of said machining structure relative to said fixed housing with said drive spindle of said machining structure and said actuating means being rotated together about said preselected axis.

8. The machine assembly of claim 7 with said rotary motor having a drive shaft adapted to be operatively connected to said positioning means at a location generally at said forward end of said fixed housing for actuating said positioning means, said rotary motor being supported on said drive spindle for rotation therewith at a location axially spaced from said forward end of said fixed housing, drive connection means for connecting said drive shaft from said rotary motor with said positioning means from said location axially spaced from said forward end of said housing, said drive shaft being connected to said positioning means for substantially direct operative engagement of said positioning means.

9. The machine assembly of claim 7 with said machining member actuable to provide a desired machining operation on the workpiece surface when in one of said radially advanced and radially retracted positions and to cease the machining operation when in the other of said radially advanced and said radially retracted positions, sensing means for sensing when said machining member is in said radially advanced position and for sensing when said machining member is in said radially retracted position, adjustment means located in said machining structure and being operatively associated with said positioning means and being selectively adjustable for setting at least one of said radially advanced and radially retracted positions.

10. The machine assembly of claim 7 with said sensing means pneumatically sensing when said machining member is in said advanced position and said retracted position.

* * * * *

UNITED STATES PATENT AND TRADEMARK OFFICE
CERTIFICATE OF CORRECTION

PATENT NO. : 5,759,000
DATED : June 2, 1998
INVENTOR(S) : W. W. Wawrzyniak, T. E. Wawrzyniak & R. A Habarth It is certified that error appears in the above-identified patent and that said Letters Patent is hereby corrected as shown below:

Col. 5, line 58, delete "2b" and substitute therefor --28b--.

Col. 12, line 67, "delete 17c" and substitute therefor --179c--.

Col. 13, line 38, delete "radial bores" second occurrence.

Signed and Sealed this

Seventeenth Day of November, 1998

Attest:

BRUCE LEHMAN

Attesting Officer        Commissioner of Patents and Trademarks